United States Patent [19]

Wilke et al.

[11] Patent Number: 4,805,740
[45] Date of Patent: Feb. 21, 1989

[54] MOTOR-DRIVEN BRAKE SYSTEM, ESPECIALLY FOR RAIL VEHICLES

[76] Inventors: Richard Wilke, Am Weissenfeld 4, 5830 Schwelm; Helmut Korthaus, Fernblick 3, 5600 Wuppertal, both of Fed. Rep. of Germany

[21] Appl. No.: 173,729

[22] Filed: Mar. 25, 1988

[30] Foreign Application Priority Data

Mar. 26, 1987 [DE] Fed. Rep. of Germany ....... 3709952

[51] Int. Cl.⁴ ............................................. B60T 13/04
[52] U.S. Cl. ................................. 188/173; 188/196 R; 188/1.11; 192/90; 303/20
[58] Field of Search ............... 188/171, 173, 1.11, 188/196 R, 158-165; 303/71, 20; 318/372, 362; 310/93, 77; 192/90, 111 A

[56] References Cited

U.S. PATENT DOCUMENTS

| 3,981,542 | 9/1976 | Abrams et al. | 303/20 |
| 4,023,864 | 5/1977 | Lang et al. | 303/20 |
| 4,136,304 | 1/1979 | Baechler et al. | 188/171 X |
| 4,327,414 | 4/1982 | Klein | 188/158 X |
| 4,445,596 | 5/1984 | Waters et al. | 188/171 |
| 4,557,355 | 12/1985 | Wilke et al. | 188/173 |
| 4,609,080 | 9/1986 | Sekella | 188/171 |
| 4,651,852 | 3/1987 | Wickham et al. | 188/173 X |
| 4,717,865 | 1/1988 | Caputo | 188/171 X |

FOREIGN PATENT DOCUMENTS

| 2208936 | 9/1973 | Fed. Rep. of Germany . |
| 3010335 | 9/1981 | Fed. Rep. of Germany . |
| 1352869 | 5/1974 | United Kingdom . |
| 2141502 | 12/1984 | United Kingdom . |

Primary Examiner—Douglas C. Butler
Attorney, Agent, or Firm—Herbert Dubno

[57] ABSTRACT

A brake system for a rail vehicle provides a strain-gauge sensor in the brake-force path to be connected in a Wheatstone bridge control together with a variable resistance for setting the desired brake force. The latter includes an infrared photo FET bridged by a parallel-fixed resistor and forming another branch of the bridge, the photodiode being controlled by the vehicle operator. The Wheatstone bridge controls a motor connected by a spindle drive to the actuator for the brake mechanism.

11 Claims, 2 Drawing Sheets

MOTOR-DRIVEN BRAKE SYSTEM, ESPECIALLY FOR RAIL VEHICLES

FIELD OF THE INVENTION

Our present invention relates to a motor-driven brake system, especially for rail vehicles, and, more particularly, to a motor-driven brake system of the type in which a brake actuator can be displaced into a brake-release position by an electric motor and is driven into its brake-engaged position by a force-storing spring. The invention is especially intended to provide a control system which will allow control of the braking force in such a system.

BACKGROUND OF THE INVENTION

A motor-driven brake system for rail vehicles and the like can comprise a brake mechanism having jaws or shoes which confront and engage a movable brake member such as a disk, and an actuator connected by a rod to one or both of the brake shoes.

In the system described in German patent document DE-PS No. 30 10 335, an electric motor is operated to drive a threaded spindle which cooperates with a nut on the actuator to retract the actuator and thereby displace the brake into its open, disengaged or relieved position while, at the same time, compressing a force-storing spring which acts upon the actuator when the motor is deenergized and the spindle is released to drive the actuator in the brake-engaging stroke.

The brake actuator can be a shiftable tube having an eye connected to the brake rod and hence to the brake shoe and the force-storing spring, of course, will then generate a braking force which is transmitted to the brake shoe through the mechanical linkage described.

The electric motor is provided with a control circuit which can feed the electric motor with a voltage variable between the minimum value and a maximum value to operate the brake force.

The control circuit, in turn, receives a signal from the brake mechanism via a signal transmitter or sensor which can be in the form of a Wheatstone bridge having two variable resistances.

The brake system thus described, therefore, allows the electric motor, by appropriate electrical energization thereof, during expansion of the force-storage spring, to control the brake force and provide an especially effective sensing and control of the braking action applied by the brake shoes to the rotary member or disk of the brake mechanism.

The control of the electric voltage for the storage-spring stressing motor is effected through a Wheatstone-bridge arrangement which in a zero balance state (corresponding to complete equality of the two variable resistances and full balance of the bridge) brings the motor to standstill and turns on a holding brake which retains the threaded spindle against rotation.

In practice, it has been found to be necessary with this type of brake system to subject the brake device, comprised of the motor and the force-storing spring, to calibration on a testing stand. From the spring characteristic, it is possible to determine the brake force delivered to the brake mechanism for any particular stroke of the actuator.

It has already been indicated that the setting of the bridge to full balance or zero output, corresponding to cutoff of the motor and actuation of the holding brake for the spindle depends upon the development of a balance in two branches of the bridge. To enable this to occur for a variety of positions of the actuator and hence in accordance with the spring characteristic, it has been necessary heretofore to connect a branch of the bridge to the actuator so that the bridge also was capable of sensing the position of the actuator.

The drawback of the bridge, of course, was that calibration of the brake device was necessary on a test stand in a series of tests. In spite of such calibrations, however, it was impossible to avoid a spread or deviation from the calibration values. Furthermore, different aging conditions affected the spring characteristics of different brake devices differently and over the life of the brake units, considerable change was noted from the calibrated or standardized determinations originally made. Naturally removal of the unit for calibration and standardization posed a significant hardship.

Mention should be made of German patent document DE-OS No. 22 08 936 which describes a setpoint/actual value comparison in association with a Wheatstone bridge and in conjunction with brakes for other purposes and of other constructions, especially hydraulic brakes. In this arrangement, a barometer-like sensor is provided with a wear-sensitive rod together with a wiper resistor within the Wheatstone bridge to permit after-adjustment during operation of the system.

Mention may also be made of the United Kingdom Pat. No. 1,352,869 which discloses the use of electrical photoresistors which are operated in response to an exciting-light current controlled by the mechanical swing of a braking process at a trailer drawn by a motor vehicle.

OBJECTS OF THE INVENTION

It is the principal object of this present invention to provide a brake system which is generally of the type described in German patent No. 30 10 335 but such that at over-long operating times, fine control of the brake force is possible and alterations in the spring characteristic of the storage spring can no longer have an effect upon control of the brake force.

Another object of this invention is to provide an improved brake system operating with a force-storing spring but which nevertheless allows reliable and sensitive control of the braking force without aging effects.

Still another object of the invention is to provide a brake system for the purposes described with improved means controlling the brake force which eliminates unreliable and wear-sensitive mechanically alterable resistors.

SUMMARY OF THE INVENTION

These objects and others which will become apparent hereinafter are attained, in accordance with the invention, in an improved brake system of the type generally described above and which comprises:
a brake rod, at least one brakeshoe operatively connected with the rod and a rotary brake member engageable by the brakeshoe, especially for a rail vehicle, the brake-operating system comprising:
a brake actuator connected to the rod and displaceable in one direction to cause the brakeshoe to engage the member and in an opposite direction to retract the brakeshoe from the member;
an electric motor energizeable to retract the brakeshoe from the brake member and provided with a driver connected with the actuator, and a control circuit for variable electrical energization of the electric motor;

a force-storing spring acting upon the brake actuator to drive the actuator in the one direction to apply the brakeshoe to the member with a braking force generated by the spring, the spring being stressed upon energization of the motor to retract the brakeshoe from the member; and a brake-force controller comprising:

a brake-force sensor in the form of at least one strain-gauge measuring resistance disposed between the spring and the brakeshoe and varying in accordance with the braking force, a command-variable resistance including a photoresponsive field-effect transistor having output terminals bridged by a parallel-connected fixed resistor, and an infrared light source of variable intensity juxtaposed with the field-effect transistor for controlling the command-variable resistance and selectively energizeable to vary the command-variable resistance on command, and means connecting the resistances as respective branches in a Wheatstone bridge circuit connected to the control circuit for varying energization of the electric motor to control the braking force upon an imbalance of the bridge resulting from development of different resistance values in the branches from those at which the bridge is in balance.

More particularly, the brake force is detected in the path between the force-storing spring and the brakeshoe, preferably by strain-gauge resistor strips or a load cell, e.g. in the actuator close to its eye or in the region of the brakeshoe with the resistance formed by the strain-gauge strips constituting a first variable-bridge resistance in a branch of the Wheatstone bridge.

The second variable-bridge resistance, forming another branch of the Wheatstone bridge, is variable in accordance with brake commands and includes a field-effect transistor responsive to infrared light and whose output terminals are bridged by a fixed resistor. An infrared light source is juxtaposed with the phototransistor and is energized with a variable current in the form of the brake commands.

According to a feature of the invention, the resistance value of the field-effect transistor is a multiple of the resistance value of the parallel-connected fixed resistor and the resistance value of the latter is of the same order of magnitude as the remaining fixed resistances of the Wheatstone bridge as well as the resistance value of the first resistance made up of the strain-gauge strips in an unloaded state thereof.

The system of the invention eliminates the need to link a variable resistor of one of the branches of the Wheatstone bridge to the actuator to respond to the displacement thereof and, therefore, the degree of expansion of the storage spring means. Instead of such a link, the strain-gauge strips are used and can be located directly in the brake-force path generated by the spring.

The second variable resistance, consisting of the photofield effect transistor bridged by the fixed resistor can be calibrated directly in a pressure-measuring bar or in any other standard calibrating device. When the second variable resistance is to be set to a predetermined value corresponding to a given pressure corresponding to a given force of the strain-gauge strips of the first variable resistance, the two resistances will have equal value and at this moment the bridge will be in balance.

At the point of balance, the bridge may effect the switching and control processes as in the case of balance in the prior brake system described in German patent No. 30 10 355. The device contributed by the present invention, therefore, performs the function of a control circuit.

It can easily be seen, to the point that further description is not necessary, that a change in the second variable resistance will also result in a change in the brake pressure until the resistance value generated by the strain-gauge strips rises and falls to the setting provided by the second variable resistance, and until the bridge balance is restored by control of the motor and resulting in reengagement of the holding brake. The latter will thus retain the new brake force value.

The strain-gauge strips can, in the usual manner, be provided with additional resistors for temperature compensation so that the first resistance formed by the strain-gauge strips will be largely insensitive to temperature and will generate outputs which can absolutely represent the brake force or pressure.

By equipping the brake system with strain-gauge strips, suitably compensated for temperature, the previously required standardization or test-bench calibration of all units of a series of such brake systems, is no longer necessary. There is no need to determine the spring characteristics of the force-storing spring elements with precision. Rather it suffices to maintain the conventional manufacturing tolerances in the production of such springs. This can be done by testing of selected specimens from a production run.

Apart from the elimination of calibration and standardization procedures to ensure quality control, to a large measure, the system of the invention has the advantage further that there is no resistor of the Wheatstone bridge which must be mechanically connected to the actuator by a wiper arrangement or the like. The brake system as a whole is thereby simplified and the fabrication of the system is facilitated and made less expensive.

Between the brake mechanism and the control unit, moreover, one does not have to maintain any particular structural relationship and it suffices to provide a connection between the strain-gauge strips and the input terminals of the bridge which is in the form of a shielded cable.

The simplification of the construction of the system of the invention allows elimination of the amplifier generally provided in prior art strain-gauge arrangements between the strain gauge and the elements to which they are connected. In the past it has been customary generally when strain-gauge strips were used to have the latter input directly to such amplifiers so that the output was a controlled voltage or controlled current. Elimination of additional amplifiers for the strain gauges, of course, saves in the cost of the unit and eliminates the need for additional electric power sources while eliminating additional sources of problems.

In practice it has been found that the system permits precise control of the brake force applied to the wheels of the vehicle to be braked, independently of unavoidable elasticity in the brake linkages and play in the journal pins for the brake device utilizing a particularly simple construction.

It has been found to be especially advantageous to provide the brake command to the second variable bridge resistance by control of the infrared light source which operates upon the field-effect transistor.

Since the light source and the field-effect transistor can be enclosed in a housing, ambient light and other external effects on the command signal can be executed.

The variable-control current which is applied to the second variable resistance of the bridge can be initiated by the operator-controlled switch of the rail vehicle. The invention has the further advantage that it allows central control for all of the infrared light sources and respective field-effect transistors of the braking devices of the vehicle.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
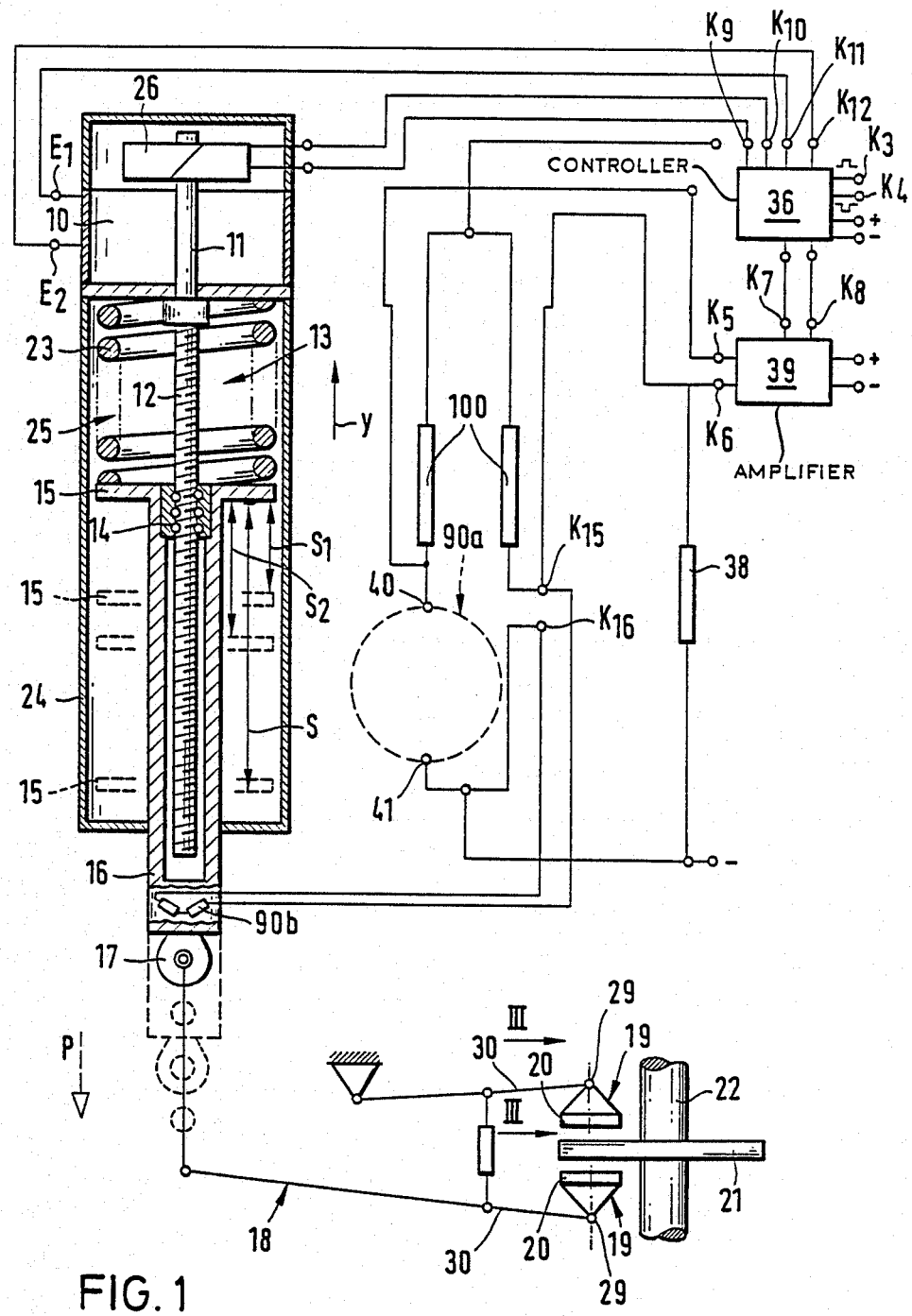
FIG. 1 is a block diagram having structural elements in axial section diagrammatically illustrating a motor-driven brake-control system in accordance with the invention.

In FIG. 1, we have shown an electric motor 10 which is coupled by a shaft 11 to a threaded spindle 12 forming part of a screw-thread drive represented generally at 13 which is driven by the motor 10 and serves to stress a force-storing spring means represented generally at 25.

The rotatable threaded spindle 12 is secured against axial displacement and is engaged in a circulating-ball nut 14 which is fixed force fittingly and formfittingly in an actuator which comprises a plate 15 forming a seat for the spring 23. The spring plate 15 is formed as part of an actuator tube 16 within which the spindle extends and which is formed, at its end projecting from a housing containing the drive arrangement, with an eye 17.

The eye 17 is articulated as shown only schematically, with a brake rod 18 operatively connected to a pair of brakeshoes 19 carrying brake linings 20.

The brakeshoes 19 with their brake linings 20 act upon a brake disk 21 rotatable on a shaft 22 about an axis and coupled by the shaft to wheels of a rail vehicle.

The housing 24 receives the force-storage spring 23 of the force-storing means 25, the spring 23 being a coil spring which tends to drive the actuator 15, 16 downwardly and the tube 16 out of the housing.

The electric motor 10, which can be referred to as a retraction motor since, when driven, it tends to draw the tube 16 into the housing, has terminals $E_1$ and $E_2$ with which the motor can be energized electrically to displace the actuator in the direction of arrow y and thereby compress the spring 23 against the wall of the housing.

FIG. 1 represents the overall spring path of the storage spring 25 by the reference character S. The spring path will, of course, depend upon the wear of the brake linings 20. For example, for new brake linings, the spring path may be represented at $S_1$. With partially worn brake linings 20, a spring path $S_2$ may arise. The maximum spring path S only arises when the brake linings 20 are substantially completely worn.

It is also possible, utilizing the system of the invention, upon relief of the brakeshoes 19, to displace the actuator, not through its full stroke, but rather through a constant partial stroke or spring path of the storage spring 25.

In any event, the brake linings 20 are displaced away from the brake disk 21 when the actuator 15, 16 is not in its broken-line position but rather is in its full-line position.

In the full-line position shown, the motor 10 is cut off and the electromagnetic brake 26, also referred to as a holding brake, is switched on. As long as the holding brake 26 is electrically energized, the spindle 12 is prevented from rotating.

The holding brake 26 is energized electrically through terminals $K_9$ and $K_{10}$. The brakeshoes 19 are held out of engagement with the disk and the brake is released to permit rotation of the disk 21 and the vehicle wheels. To actuate the brake, the control circuit 36 receives an electric brake pulse via the terminal $K_3$ to deenergize the electromagnetic holding brake 26.

The force-storing spring 23 drives the spring plate 15 downwardly and the actuator tube 16 out of the housing 23 when the spindle drive 13 is neither driven by the motor 10 nor braked by the holding brake 26. Because the circulating-ball nut permits a high-efficiency axial displacement of the actuator 15, 16 while the shaft 12 freewheels, the spindle drive does not hinder the displacement of the actuator 15, 16 in the absence of excitation of the motor 10 or engagement of the brake 26.

Thus when the brakeshoes 19 are to disengage from the brake disk 21, a pulse-signalling application of the brake is applied to the terminal $K_4$ of the control circuit 36 to apply the full operating voltage, of, for example, 24 volts to the electric motor 10 and drive the latter to retract the actuator 15, 16 into its starting position which can be the solid-line position shown in FIG. 1, thereby compressing the spring. The starting position can be established in any desirable manner, e.g. through a limit switch.

The brake force P is controlled as follows:

A Wheatstone bridge is formed by two fixed resistances 100, a first variable resistance formed by a pair of strain-gauge strips and represented at 90b, and a second variable resistance shown generally at 90a and described in greater detail with respect to FIG. 1.

The strain-gauge strips 90 form one of the four branches of a four-branch Wheatstone bridge. Instead of two strain-gauge strips 90b, it is possible to use a single strain-gauge strip of a greater number of strain-gauge strips. More strain-gauge strips are preferred because the additional strips increase the range of resistance change.

The variable resistance 90a can be directly calibrated in a pressure-measuring rod. The variable resistance is set to a predetermined brake-pressure measurement, the bridge will show a balance when the strain-gauge strips forming the first resistance detect a brake pressure P delivered to the brake of an equal magnitude, i.e. the strain-gauge strips have the same total resistance value as the resistance value of the second resistance 90a.

When the bridge is in balance, there is zero output from the bridge. Clearly, therefore, the variable resistence 90a serves to establish a setpoint for the brake pressure which is compared with the actual value of the brake pressure represented by the resisted value of the stain-gauge strips 90b.

During the braking process, should the brake force be varied, i.e. increased or reduced, the variable resistance 90a is likewise varied in resistive magnitude.

The result is an imbalance of the bridge and the bridge voltage is applied through a hot-ohmic resistor 38 to the terminals 55, 56 of an amplifier 39 of a conventional design. The resistor 38 serves as a bridge-equalizer resistor.

The amplifier 39 delivers via terminals $K_7$ and $K_8$ an output to the control circuit 36 in the form of a DC voltage proportional to the bridge output and a corresponding proportional voltage is supplied by the control circuit 36 to the output terminals $K_{11}$ and $K_{12}$ which are connected to the motor input terminal $E_1$, $E_2$.

In the case in which the force P delivered by the brake device and hence detected by the strain-gauge strip arrangement 90b is excessive by comparison with the setpoint force established by the second resistance 90a, the electric motor 10 delivers a force which counteracts the force applied by the spring 25 so that the brake force is reduced until there is again balance in the bridge 100, 100, 90a, 90b to ultimately extinguish the control voltage across terminal $K_7$, $K_8$ and the output voltage as terminals $K_{11}$ and $K_{12}$. At this point, a brake voltage is generated at the terminals $K_9$, and $K_{10}$ and is applied to the electromagnetic holding brake to immobilize the spindle 11 and hence driven displacement of the actuator 15, 16.

In the case, however, in which the brake force P is less than the value corresponding to the setting of the second resistance 90a, the resistance in the strain-gauge strips will be correspondingly less. The analogous control process will, therefore, be initiated and the electromagnetic brake 16 will be released and the control voltage applied by terminals $K_7$ and $K_8$ to the controller 36 will be such that the output voltage from terminals $K_{11m}$, $K_{12}$ will drive the motor 10 to reduce the resistance to the spring 25.

The brake force P will be increased until the changing resistance value detected by the strain-gauge arrangement 90b brings the bridge back into balance. Upon return to a balanced state, the electromagnetic holding brake 26 is again activated and the motor 10 shut down or energized just sufficiently to balance the force generated by the spring 25 which exceeds the brake force P to be applied.

Figure 2:
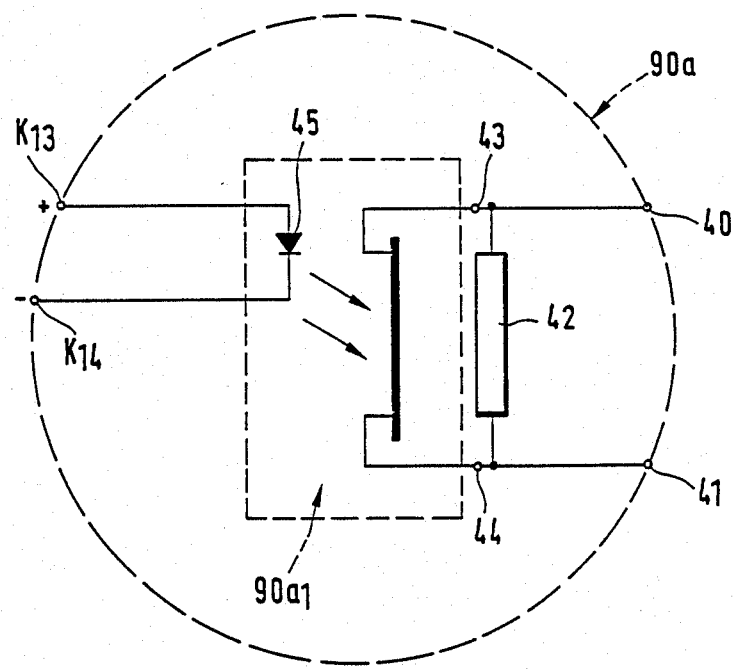
FIG. 2 is a diagram illustrating the second variable resistance for the system of FIG. 1.

FIG. 2 shows an appropriate construction of the second resistance according to the invention.

The terminals which connect the variable resistance to the remainder of the Wheatstone bridge have been indicated at 40 and 41 and parallel to these terminals, the second resistance comprises a fixed resistor 40. The fixed resistor 42 is also in parallel to a photofield-effect transistor $90a_1$ which comprises the field-effect transistor proper and a photodiode 45 generating infrared radiation which alters the resistance of the stretch of the field-effect transistor which is bridged by the fixed resistor. A photofield-effect transistor of this type is marketed under the name "Photon Coupled Bilateral Analog FET" as types H11 F1, H11 F2 and H11 F3 of the General Electric Co.

The resistance of this field-effect transistor is calibrated by changing the control current delivered to the infrared LED 45 via terminals $K_{11}$ and $K_{14}$. The resistance varies between the terminals 43 and 44 continuously with the supplied control current.

The field-effect transistor can have a resistance which is greater than at least a power of 10 or order of magnitude than the resistance of the strain-gauge arrangement 90b. For example, the fixed resistors 100 and 42 and the strain-gauge resistance 90b can have values of 700 ohms (in an unloaded state of the strain-gauge arrangement) while the resistance of the field-effect transistor, at its maximum can be about 7,000 ohms.

The parallel connection of the fixed resistance 42 and the field-effect transistor $90a_1$ has the advantage that the total resistance of branch 90a can be varied from finely in the region of 700 ohms by varying the resistance of the field-effect transistor. This has the effect of providing a high-bridge sensitivity to changes in the resistance values of the strain-gauge arrangement 90b. The high sensitivity of the bridge branch 90a permits relatively small resistance changes in the strain-gauge strip arrangement 90b for response to a command delivered to the field-effect transistor.

The direct current applied across the terminals $K_{13}$ and $K_{14}$ permits the delivery of a control current which generates a linear response in terms of a field-effect transistor resistance so that a change in the control current in response to the setting of the drive switch or controller for the vehicle is a measure of the latter and serves in corresponding measure to alter the braking-force setpoint.

When, under the conditions described, the total resistance of the bridge branch 90a is increased to 701 ohms while actual resistance of the strain-gauge strips 90b remains at 700 ohms, the motor 10 is operated to change the brake force until the resistance of the strain-gauge strips increases to 701 ohms, thereby bringing the Wheatstone bridge back into balance.

Figure 3:
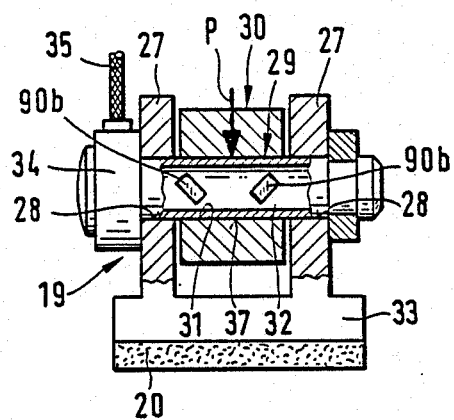
FIG. 3 illustrates an alternative mounting for the strain-gauge strips in a region corresponding to the section line III—III of FIG. 1.

In FIG. 3 we have shown another arrangement of strain-gauge strips according to the invention.

Here each of the brakeshoes 19 comprises a support plate 32 and two bracket-like webs 27 extending perpendicularly to this plate. A hollow pin 29 traverses these webs 27 in openings 28 thereof and the space 31 between the webs in a half 30 of a pair of brake tongs or jaw members.

The hollow pin 29 is provided on its inner surface 32 with two or more strain-gauge strips 90b adhesively bonded to this inner surface.

The electric supply to the strain-gauge strips 90b is effected through the hollow bold head 34 by a cable connector 35 to the terminals $K_{15}$ and $K_{16}$ seen in FIG. 1.

The arrangement 38 shown in FIG. 3 operates as follows:

In the arrangement illustrated in FIG. 1, both of the brakeshoes 19 can each be provided with a hollow pin 29 having the strain-gauge strips 90b. It is also possible, however, to mount only one of the brakeshoes 19 with a hollow pin 29 provided with two strain-gauge strips 90b.

When the actuator 15, 16 delivers the brake force from the force-storing spring 25 via the eye 17 to the/or each brakeshoe 19, the hollow pin 29 is pressed by a corresponding force against one side of the opening 31 of member 30 to deform the periphery 29 of the hollow pin.

The pin thus held at its end in the openings 28 of the webs 27 is thereby bent more or less elastically with a force corresponding to the brake force and with a distortion which is proportional thereto. This elastic deformation results in an extension or compression of the strain-gauge strips to alter the resistance thereof The resistance change in the strain-gauge strips 90b is directly proportional to the braking force P.

The embodiment of FIG. 3 is used when it is possible that within the brake rod 18 there may be uncontrollable losses. The losses do not affect the brake force when measured at the brakeshoe as in the FIG. 3 embodiment. Indeed, in this embodiment the brake force is measured directly at the location at which it is applied so that any kind of efficiency reduction in the brake path is eliminated.

While it is not absolutely necessary to provide temperature-compensation means in the/or each strain gauge unit 90b, it is preferred in that case to compensate for temperature dependency by selecting the resistances forming the unit 90a so that they will compensate for changes in temperature. This may be especially important in the embodiment of FIG. 3 because the strain-gauge unit is here located close to the source of friction heat generated by application of the brake.

We claim:

1. A brake-operating system for a brake mechanism having a brake rod, at least one brakeshoe operatively connected with said rod and a rotary brake member engageable by said brakeshoe, especially for a rail vehicle, said brake operating system comprising:
   a brake actuator connected to said rod and displaceable in one direction to cause said brakeshoe to engage said member and in an opposite direction to retract said brakeshoe from said member;
   an electric motor energizeable to retract said brakeshoe from said brake member and provided with a driver connected with said actuator, and a control circuit for variable electrical energization of said electric motor;
   a force-storing spring acting upon said brake actuator to drive said actuator in said one direction to apply said brakeshoe to said member with a braking force generated by said spring, said spring being stressed upon energization of said motor to retract said brakeshoe from said member; and
   a brake-force controller comprising:
      a brake-force sensor in the form of at least one strain-gauge measuring resistance disposed between said spring and said brakeshoe and varying in accordance with said braking force,
      a command-variable resistance including a photo-responsive field-effect transistor having output terminals bridged by a parallel-connected fixed resistor, and an infrared light source of variable intensity juxtaposed with said field-effect transistor for controlling the command-variable resistance and selectively energizeable to vary the command-variable resistance on command, and
      means connecting said resistances as respective branches in a Wheatstone bridge circuit connected to said control circuit for varying energization of said electric motor to control said braking force upon an imbalance of said bridge resulting from development of different resistance values in said branches from those at which said bridge is in balance.

2. The brake-operating system defined in claim 1 wherein said field-effect transistor has, between said output terminals, a resistance value which at least a number of times greater than the resistance value of said fixed resistor, said means connecting said branches in said Wheatstone bridge circuit including two further branches including fixed resistors of resistance values of the same order of magnitude as the resistance value of the brake-force sensor.

3. The brake-operating system defined in claim 1 wherein said infrared light source has a pair of terminals connected to a variable-electric-current source.

4. The brake-operating system defined in claim 3 wherein said actuator is a tube provided internally with a nut and having a spring plate against which said spring bears, said operator being a threaded spindle engaged by said nut, extending into said tube and driven by said motor, said tube having an eye connected to said rod.

5. The brake-operating system defined in claim 4 wherein said sensor is provided in said actuator.

6. The brake-operating system defined in claim 5 wherein said sensor is provided in said actuator adjacent said eye.

7. The brake-operating system defined in claim 4 wherein said sensor is provided between said rod and said brakeshoe.

8. The brake-operating system defined in claim 4 wherein said mechanism comprises a pair of brakeshoes straddling a brake disk forming said member, said rod forming part of a pair of brake tongs displacing both said brakeshoes toward and away from said disk.

9. The brake-operating system defined in claim 4, further comprising an amplifier connected between terminals of said bridge to said control circuit.

10. The brake-operating system defined in claim 4, further comprising an electromagnetically operated brake provided for said spindle and controlled by said control circuit for selectively immobilizing said spindle.

11. The brake-operating system defined in claim 4 wherein said nut is a circulating ball nut which is mounted against rotation in said actuator.

* * * * *